United States Patent

[11] 3,588,522

[72] Inventor James H. Blossom
Amarillo, Tex.
[21] Appl. No. 806,361
[22] Filed Mar. 12, 1969
[45] Patented June 28, 1971
[73] Assignee Seisomograph Service Corporation
Tulsa, Okla.

[54] POWER CONTROL CIRCUIT FOR REMOTE DATA RECORDER SYSTEM

6 Claims, 2 Drawing Figs.

[52] U.S. Cl. 307/125, 307/142
[51] Int. Cl. H01b 1/24
[50] Field of Search 307/116, 125, 132, 142; 340/163, 213, 213.1

[56] References Cited

UNITED STATES PATENTS

| | | | |
|---|---|---|---|
| 3,349,374 | 10/1967 | Gabrielson et al. | 340/408X |
| 3,382,484 | 5/1968 | Sibley | 340/163 |
| 3,394,349 | 7/1968 | Day | 340/163 |
| 3,413,605 | 11/1968 | Abramson et al. | 340/163 |

*Primary Examiner*—Robert K. Schaefer
*Assistant Examiner*—H. J. Hohauser
*Attorney*—Owen, Wickersham & Erickson

ABSTRACT: A control device for use with data transmission apparatus connected to equipment at a remote installation and responsive to a change of status input from the equipment to close a circuit from a power source to the data transmission apparatus to thereby facilitate the reporting of the status change to a central station.

Figures 1, 2:
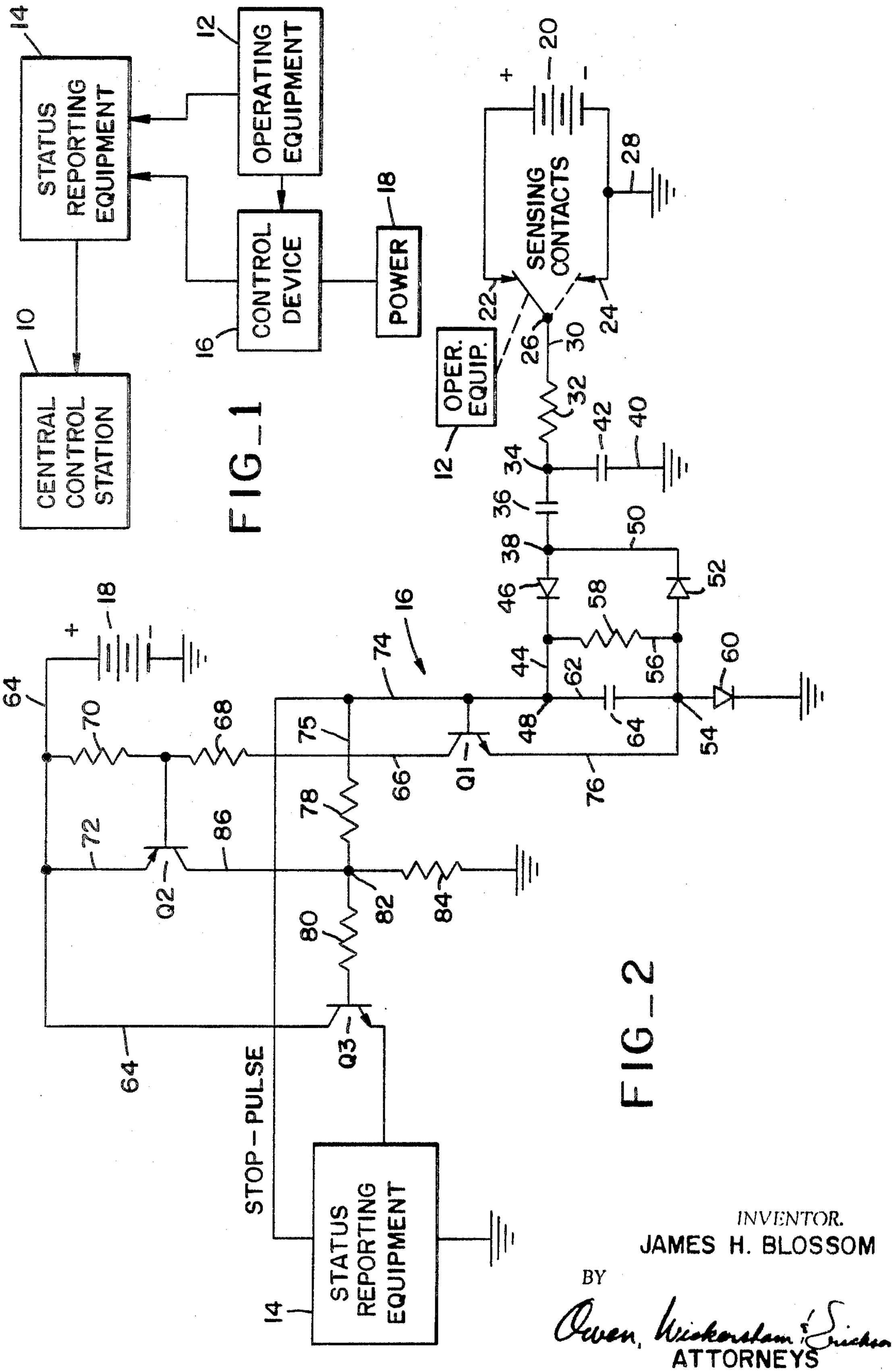

INVENTOR.
JAMES H. BLOSSOM
BY
Owen, Wickersham & Erickson
ATTORNEYS

POWER CONTROL CIRCUIT FOR REMOTE DATA RECORDER SYSTEM

This invention relates generally to switching circuits and more particularly to a control device for temporarily energizing a status-reporting communication system at a remote station.

Status-reporting or remote control systems for field equipments located at widely dispersed or remote locations from a central station have been used extensively because of their obvious advantages of increased efficiency and low manpower requirements. However, in many instances the field equipment is also located far from any source of commercial power. This is especially true in oil and gas fields which are located in virtually inaccessible areas and yet have numerous pieces of equipment whose status must be known in order to operate the facility. Under such circumstances, the associated electronic equipment may be powered by "dry batteries," but with this arrangement the associated electronic equipment, such as that required for the data transmission, must be designed to minimize "standby" power drain. If not, the system becomes unreliable or completely inoperative.

A general object of the present invention is to provide a reporting apparatus which draws power only when the status of associated equipment has changed and then only long enough to initiate some required reaction to the change of status.

Another object of the present invention is to provide a circuit reporting equipment between a power source and a station for energizing the reporting equipment only when the status of the monitored equipment changes, allowing the reporting equipment to remain quiescent without consuming power when no status changes are occurring.

Yet another object of the invention is to provide an automatic starting circuit that is compact, reliable and particularly well adapted for ease and economy of manufacture.

The aforesaid objectives are accomplished in accordance with the present invention by a circuit comprising a first electronic switch means connected between the reporting apparatus and the power source, a latching means for holding the electronic switch means closed and a control means for operating the latching means that operates in response to an input signal created by a change of status of the monitored equipment.

The latter includes a pair of sensing contacts connected to a battery, and movable alternately between the contacts is a switching arm or the like which is actuated by the monitored equipment. With the latter arm in one positions, an electrical current is applied directly through one contact to a control transistor that triggers the latching means, and when the arm moves to the alternate sensing contact, a stored electrical charge is released to the same control transistor. Thus, with each change of status that moves the switching arm from one contact to another, the reporting apparatus is supplied with power from the power source.

Other objects and advantages of the present invention will become apparent from the following description of one embodiment presented in conjunction with the drawing, in which:

FIG. 1 is a block diagram showing a typical remote monitoring arrangement utilizing my power control device; and FIG. 2 is a circuit diagram of my power control device.

Referring to the drawing, FIG. 1 shows a typical system for monitoring or controlling at a central station 10 an apparatus or piece of operating equipment 12 located in the field remote from the central station. For example, the equipment may comprise a pump or a pressure- or flow-measuring device which is either controlled or monitored from the central station by a data transmission or reporting system utilizing a suitable communication link between the central station and a data transmitter unit 14 connected to the controlled equipment 12 on the field. Such a data transmission system is shown and described in an application Ser. No. 541,759 filed Apr. 11, 1966.

In accordance with the present invention a sensing and control device 16 connected to a power source 18 such as a battery, it also connected to the data transmitter unit. This device operates in response to a predetermined input such as a change of state in the controlled equipment to turn on and supply power to the data transmitter unit 14.

Turning to the circuit diagram of the control device 16, as shown in FIG. 2, a first battery 20 is provided which is connected by leads from its positive and negative terminals to a pair of contacts 22 and 24 of a switch having a third contact 26. The terminal 24 connected to the negative battery terminal is also connected by a lead 28 to ground. An arm of the switch connected to the contact 26 is movable between the contact terminals 22 and 24 by some external means (not shown), which is actuated by the equipment 12 being monitored. For example, a pneumatic relay may be activated by a change in state of the equipment to move the switch arm from one contact to another. It is understood that the switch arm shown is merely representative of any mechanical device for changing contacts upon a change in status. The contact terminal 26 of the switch arm at its pivot point is connected to a first branch lead 30 through a resistor 32 to a first junction 34 and thence through a capacitor 36 to a second junction 38. Extending from the first junction 34 is a lead 40 through a capacitor 42 to ground. From the second junction 38 extends a lead 44 which is connected in series to the anode of a diode 46 and thence from this diode to a third junction 48. From the junction 38 a lead 50 also extends to the cathode of a diode 52 whose anode is connected to a fourth junction 54. Interconnecting the leads 44 and 50 is a lead 56 containing a resistor 58. The fourth junction is also connected through a diode 60 to ground, and the third and fourth junctions 48 and 54 are interconnected by a lead 62 through a capacitor 64.

A second battery, shown as the power supply 18 in FIG. 1, has a negative terminal connected to ground, supplies current through a lead 64 to three transistors Q1, Q2 and Q3. The collector of transistor Q1 is connected by a lead 66 to the power lead 64 through a pair of resistors 68 and 70 in series. Between the latter resistors the lead 66 is connected to the base of the second transistor Q2. The emitter of the second transistor is connected by a lead 72 to the supply lead 64 and the collector of the third transistor Q3 is connected directly to the lead 64.

The base of transistor Q1 is connected to a lead 74 from the status-reporting equipment 14 and this lead extends to the junction 48. The emitter of transistor Q1 is connected by a lead 76 to the junction 54. The lead 74 from the reporting equipment 14 is also connected to a lead 75 through a pair of resistors 78 and 80 in series to the base of the third transistor Q3 whose emitter is connected to an input terminal of the reporting equipment 14. The reporting equipment is of the type that provides a stop or ground pulse when its transmission is completed and this pulse travels through the lead 74.

Between the resistors 78 and 80 is a junction 82 which is connected on one side through a resistor 84 to ground, and on the other side through a lead 86 to the collector of the second transistor Q2.

In operation, the status-sensing contacts 22 and 24 are coupled to the equipment 12 which is being sensed in such a manner that one state of the equipment will close contacts 22 and 26, while the second state of the equipment will close contacts 24 and 26. In accordance with the invention, a change of status will result in the application of power from the battery 18 to the controlled equipment 14 which would normally be some type of information-reporting apparatus capable of transmitting coded information concerning the status change and of putting out a ground pulse when it has completed its full operational cycle.

Thus, if sensing contacts 22 and 26 are in the position shown in FIG. 2, the junction 34 between the capacitors 36 and 42 and the resistor 32 is charged to a plus potential from the battery 20. The return path is through the diode 46, the resistor 58 and the diode 60. Since the junction 38 is negative with respect to the junction 34, the latter will be forced to ground potential if the sensing contacts shift so that contacts 24 and 26 are closed. This will cause junction 38 to become negative with respect to ground because of the potential of the battery 20. Thus, the diode 60 will become nonconducting and the diode 52 will conduct. This forces the emitter of the transistor Q1 negative with respect to its base and thereby causing it to become conducting.

Alternatively, if the sensing contacts 24 and 26 were initially closed, the junctions 34 and 38 would both be at the same ground potential, and the transfer of the sensing contacts would cause both of them to become plus instantaneously. This plus pulse would pass through the diode 46 to the base of transistor Q1, causing it to become conducting.

Thus, it is seen that a transfer of the sensing contacts, no matter what their initial position, will cause conduction in the transistor Q1 collector circuit and this pulls the low end of the resistor 68 close to ground, thereby placing a conducting bias on the base of transistor Q2. When transistor Q2 starts conducting, the junction 82 becomes positive, thereby latching on transistor Q1 through the resistor 78 and turning on the transistor Q3 by placing a plus bias on its base through the resistor 80.

The conduction of transistor Q3 applies an operating voltage to the status-reporting equipment 14 which then proceeds to operate through its characteristic sequence of events. When the sequence is completed the reporting equipment must put out a ground pulse on the "stop-pulse" lead 74. This causes transistor Q1 to stop conducting by shorting out the base bias developed across the resistor 84 and fed through the resistor 78. This, in turn, releases the base bias resistor 68 and turns off transistor Q2 which turns off the transistor switch Q3. At this point, the circuits become quiescent and draw no current until the next change of status.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. In a system for transmitting status data from equipment in the field to a central receiving station, a control device for operating the transmitting equipment automatically in response to a change in status of the field equipment, said device comprising:

- a battery;
- a switching transistor connected to said battery and to said controlled equipment;
- a latching means connected to the base of said switching transistor and to said battery for maintaining a flow of current to said switching transistor when actuated;
- a control transistor for actuating said latching means to thereby hold said switching transistor in the on condition; and
- means for providing a flow of current to turn on said control transistor in response to each change in status of the transmitting equipment.

2. The device as described in claim 1 wherein said latter means comprises:

- a pair of sensing contacts;
- a mechanical switch means movable by said operating equipment from one said contact to another; and
- means for supplying an electrical pulse to said control transistor when said switch means moves from one contact and engages the other one.

3. The device as described in claim 1 including means interconnecting said transmitting equipment and said control transistor for supplying a pulse to turn off said transistors and thereby interrupt the flow of power from said battery to said transmitting equipment.

4. The device as described in claim 3 wherein said latter means comprises a stop-pulse lead from said transmitting equipment connected to the base of said control transistor, a branch lead connected from said stop-pulse lead through a junction to the base of switching transistor, and means connecting said junction to ground and to said latching means.

5. A device for automatically supplying power to a controlled equipment in response to a change of status of an operating equipment, comprising:

- a pair of sensing contacts;
- mechanical switch means movable alternately to each of said contacts by said operating equipment;
- a first battery means connected to said contacts;
- a control circuit means connected to said mechanical switch means for conducting electricity directly from said first battery means when said switch means is moved to one of said contacts and for releasing a stored charge of electricity when the switch means is moved to the other said contact;
- a control transistor connected to said latter means and operable to conduct in response to electricity received when said sensing contacts are changed;
- a latching transistor connected to said control transistor;
- a switching transistor connected to said latching transistor and to said controlled equipment; and
- a second battery connected to said transistors and furnishing current through said switching transistor to said reporting equipment when it is in the conducting state.

6. The device as described in claim 5 including means for supplying a stop-pulse to short out the base bias to said control transistor and terminate its conduction, thereby turning off latching and switching transistors and interrupting the flow of current from said second battery to said controlled equipment.